United States Patent [19]

Wojcik

[11] Patent Number: 4,580,894

[45] Date of Patent: Apr. 8, 1986

[54] APPARATUS FOR MEASURING VELOCITY OF A MOVING IMAGE OR OBJECT

[75] Inventor: David R. Wojcik, Woburn, Mass.

[73] Assignee: Itek Corporation, Lexington, Mass.

[21] Appl. No.: 509,497

[22] Filed: Jun. 30, 1983

[51] Int. Cl.[4] .............................................. G01P 3/36
[52] U.S. Cl. ....................................... 356/28; 356/152
[58] Field of Search .................................. 356/28, 152

[56] References Cited

U.S. PATENT DOCUMENTS 4,162,509  7/1979  Robertson .............................. 356/28
4,167,330  9/1979  Haville .................................. 356/28

Primary Examiner—Stephen C. Buczinski
Assistant Examiner—Melissa Koltak
Attorney, Agent, or Firm—Michael H. Wallach; Robert F. Rotella

[57] ABSTRACT

Apparatus for measuring the velocity of a moving image or object including a first array of sensors extending in a first direction transverse to image motion for sensing a primary set of image elements; a second array of sensors extending generally in the first direction and spaced a known distance from the first array for sensing successive sets of image elements; a device for correlating the primary set of image elements with each of the successive sets of image elements and for producing a correlation level indicating the level of correlation of the primary set with each of the successive sets; means for selecting one of the correlation levels which indicates an optimal level of correlation; and means for determining the time interval between the sensing of the first array of the primary set and the sensing by the second array of the successive set corresponding to the selected correlation level; in addition, the means for correlating may include means for comparing with the primary set each successive set in a plurality of different positions along the first direction and for producing a comparison level indicating the level of comparison of the primary set with each of the successive sets in each of the different positions along the first direction; and means for determining the displacement between the position in which the successive set is sensed and the position corresponding to the indicated comparison level.

14 Claims, 4 Drawing Figures

APPARATUS FOR MEASURING VELOCITY OF A MOVING IMAGE OR OBJECT

FIELD OF INVENTION

This invention relates to an apparatus for measuring the velocity of a moving image or object, and more particularly to such an apparatus which measures velocity by determining the time it takes a portion of the image to move between two known locations.

BACKGROUND OF INVENTION

There are many applications, such as navigation, astronomy, target tracking, image enhancement, where it is desirable to calculate the speed of an object or of an image of an object. Traditionally, many ways of detecting the velocity of an object have involved emitting signals that are reflected off the object, such as are involved in radar and sonar velocity detection systems. For many uses, detecting velocity by emitting such signals is satisfactory, but in other applications it presents problems. For example, in astronomy and navigation the celestial objects whose relative velocities are being measured are often so far away that it is impractical to emit and reflect signals off them. In certain reconnaissance and target tracking applications the emission of such signals would be undesirable because it would tend to alert an enemy to the location from which such signals were being emitted. And the cost, size and energy consumption of the equipment required to emit and receive such signals are often disadvantageous.

In addition to determining the velocity of objects, it is often desirable to be able to determine the velocity of images which are being photographed, televised, or otherwise recorded or transduced, so that such velocity can be compensated or accounted for. For example, time delay and integrate (TDI) imaging charge-coupled device (CCD) arrays, such as those used for airborne reconnaissance, typically require a determination of image velocity to function properly. TDI imaging CCD arrays are commonly constructed out of a plurality of closely spaced, parallel TDI CCD shift registers built on a photoelectric semiconductive substrate. Such devices have been designed to have an optical image scanned across the surface of their substrate along the length of their TDI shift registers and to have those shift registers clocked in synchronism with the motion of the optical image. This is done so that electrons which are freed under one of the TDI shift registers by the photoelectric effect of light in a given portion of the optical image are dumped into a charge packet that will be moved along by the TDI shift register in conjunction with that given portion of the optical image. When a charge packet reaches the end of its associated TDI shift register, it is fed, in parallel with all of the other charge packets which have reached the end of their associated TDI shift registers at the same time, into an output CCD shift register. The output shift register then rapidly shifts out all of the charge packets fed to it, so as to provide a series of charge packets, or pixel values, the variable charge levels of which correspond to the variable light intensity of a picture line taken from the two-dimensional optical image scanned across the TDI imaging CCD array.

In order for a TDI imaging CCD array to function properly, it is necessary that its charge packets be shifted down its shift registers at the same velocity as the image being scanned across its surface. Thus it is necessary to determine the image velocity in order to properly time the clocking circuitry that controls the rate at which the charge packets are shifted. It is also desirable to determine if the image has any velocity component in a direction perpendicular to such shift registers. Unless compensated for, such sideways velocity smears the image produced by the TDI imaging CCD because it causes charge packets and their associated portions of the image to become separated. However, once such sideways velocity has been determined it is possible to compensate for it by such means as rotating the TDI imaging CCD so that the image motion is parallel with its shift registers.

SUMMARY OF INVENTION

It is therefore an object of this invention to provide an improved apparatus for measuring the velocity of a moving image or object.

It is a further object of this invention to provide such an apparatus which can detect the motion of an object without the need to emit signals and reflect them off the object.

It is a further object of this invention to provide such an apparatus which can sense the velocity of an image using only two arrays of spaced sensors.

It is a further object of this invention to provide such an apparatus which can measure the velocity of a moving image or object in two dimensions.

It is a further object of this invention to provide such an apparatus which requires relatively little space and relatively little energy to operate.

It is a further object of this invention to provide such an apparatus which is relatively simple to implement.

It is a further object of this invention to provide such an apparatus which uses sensors made of charge-coupled devices.

The invention results from the realization that an apparatus can be constructed for measuring the velocity of a moving image or object by correlating image elements sensed by a first array of sensors with successive sets of image elements sensed by a second array of sensors spaced a known distance from the first array and by determining the length of time it takes a portion of the image to move from the first array to the second array, which length of time is represented by the duration between the sensing of the first set of image elements and the sensing of the one of the successive sets of image elements which has an optimum correlation with the first set.

The invention features apparatus for measuring the velocity of a moving image or object comprising a first array of sensors extending in a first direction transverse to image motion, for sensing a primary set of image elements. A second array of sensors extends generally in the same direction and is spaced a known distance from the first array for sensing successive sets of image elements. There are means for correlating the primary set of image elements with each of the successive sets of image elements and for producing a correlation level indicating the level of correlation of the primary set with each of the successive sets. There are means for selecting one of the correlation levels which indicates an optimum level of correlation. There are also means for determining the time interval between the sensing by the first array of the primary set and the sensing by the second array of the successive set corresponding to the selected correlation level.

In a preferred embodiment, there are means for calculating a forward image velocity component from the determined time interval between the sensing by the arrays and the known distance between the arrays. There may be means for comparing with the primary set each successive set in a plurality of different positions along the first direction and for producing a comparison level indicating the level of comparison of the primary set with each successive set in each of the different positions. There may also be means for indicating the one of the comparison levels which indicates the best level of comparison produced for each successive set and for indicating that comparison level of a successive set as the correlation level for that successive set. Both the means for comparing and the means for indicating may be included in the means for correlating. There may be means for determining the displacement between the position in which the successive set corresponding to the selected correlation level is sensed and the position corresponding to the indicated comparison level designated as the selected correlation level. There may further be means for calculating the lateral image velocity component from the time interval between the sensing of the primary set and the sensing of the successive set corresponding to the selected correlation level and from the displacement between the position in which the successive set corresponding to the selected correlation level is sensed and the position corresponding to the indicated comparison level designated as the selected correlation level.

The first and second arrays may be linear and at least one of the arrays may be a charge-coupled device. There may be means for changing the distance between the first and second arrays. And there may be switching means for interchanging the inputs from the first and second arrays to the means for correlating, for enabling the primary set of image elements to be sensed by the second array and the sucessive sets of image elements to be sensed by the first array for measuring velocity of images moving in the opposite direction. There may be means for using more than one CCD array for gathering successive sets in order to minimize the amount of tracking-related movement and maximize overall sensitivity.

DISCLOSURE OF PREFERRED EMBODIMENT

Other objects, features and advantages will occur from the following description of a preferred embodiment and the accompanying drawings, in which.

Figure 1:
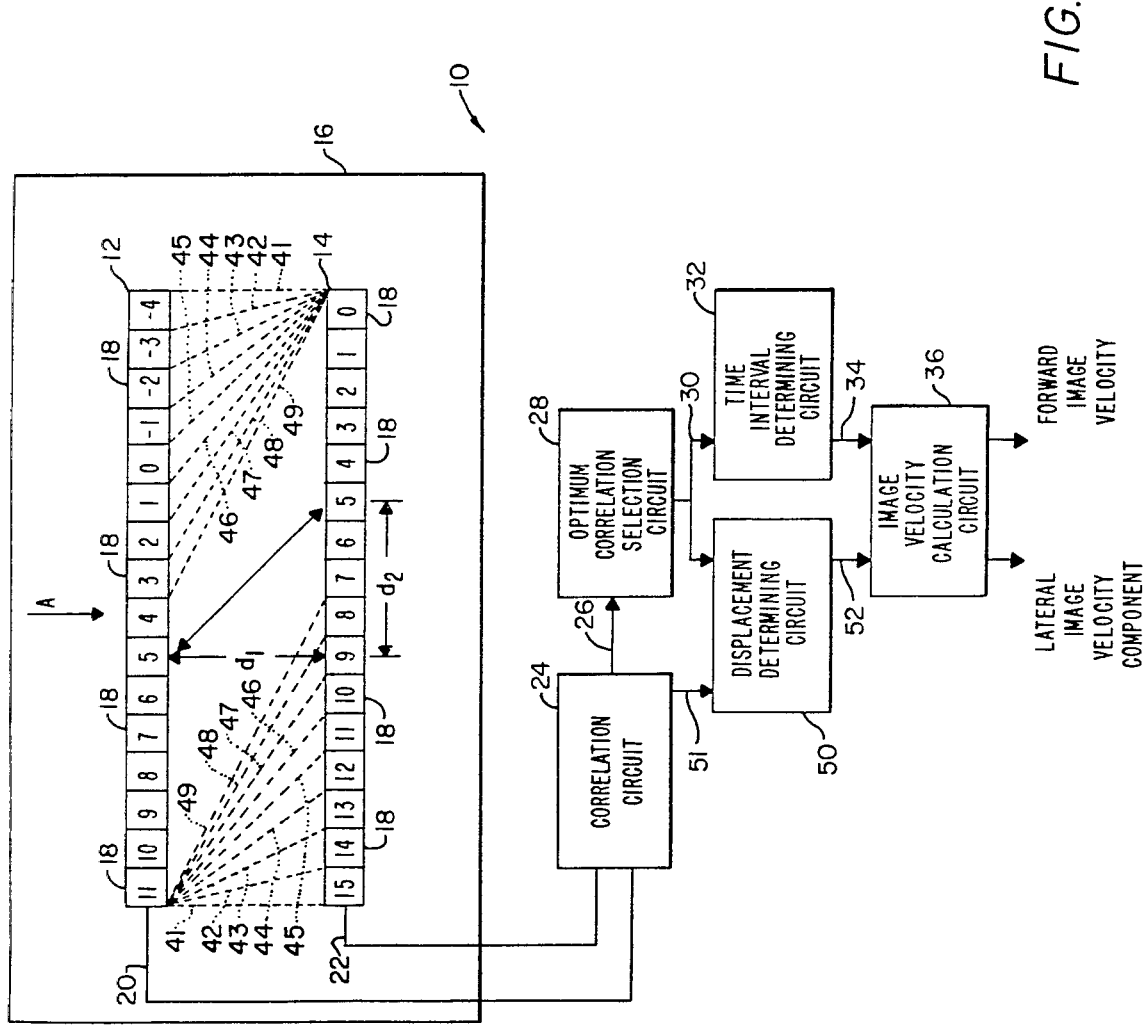
FIG. 1 is a simplified block diagram of an apparatus for measuring the velocity of a moving image according to an embodiment of the invention.

In FIG. 1 an apparatus 10 for measuring the velocity of a moving image or object is shown in a simplified block diagram. Apparatus 10 includes a first charge-coupled device (CCD) imaging array 12 and a second CCD imaging array 14. Arrays 12 and 14 are placed in the focal plane 16 of an optical image which is focussed in a conventional manner by a lens, not shown in the figure, such as the lens of an airborne reconnaissance camera. The second array 14 is spaced a known distance $d_1$ from the first array 12, and both arrays 12 and 14 extend in a direction transverse to the general direction, indicated by arrow A, of the motion of the image which is focussed upon them. In an airborne reconnaissance camera, the motion of the image in the general direction A is caused by the motion of the aircraft in which such a camera is placed relative to the ground. However, in other uses of the invention apparatus 10 may be held stationary and the object being focussed, such as an aircraft or a celestial body, may be moving, providing the image motion in the general direction A.

Each of CCD arrays 12 and 14 is a linear array of photoelectric sensors 18. In FIG. 1 each array is shown with sixteen such sensors for purposes of simplification. In an actual device each array may have over a thousand sensors. Each sensor 18 produces a charge packet, the value of which indicates the intensity of the light in the portion of the image incident upon it. Sensors 18 can each be a conventional CCD photosensitive cell or a time delay and integrate shift register composed of a plurality of such cells. In other embodiments of the invention arrays 12 and 14 could be made of sensors which respond to the color or other characteristics of the image. Arrays 12 and 14 each function as shift registers, so that the set of values, or image elements, sensed by its sensors 18 can be serially shifted out onto output lines 20 and 22, respectively, and fed into a correlation circuit 24.

Apparatus 10 is operated so that a first, or primary, set of image elements is derived from the image by sensors 18 of the first array 12 and supplied to the correlation circuit 24. Then successive sets of image elements are derived from the image at successive times by sensors 18 of second array 14 and supplied to correlation circuit 24. Correlation circuit 24 correlates the primary set of image elements derived by first array 12 with each of the successive sets of image elements derived by second array 14 and produces a correlation level on its output line 26 indicating the level of correlation of the primary set with each of the successive sets. The correlation levels on output line 26 are supplied to an optimum correlation selection circuit 28 which selects, from all the correlation levels produced in response to a plurality of the successive sets, the one which indicates an optimum level of correlation between the primary set and a secondary set.

Selection circuit 28 has an output line 30 which is supplied to a time interval detecting circuit 32. Time interval detecting circuit 32 determines the time interval between the sensing of the primary and the selected secondary sets and supplies that time interval over an output line 34 to an image velocity calculation circuit 36.

The selection of a correlation level indicating an optimal level of correlation between the primary set and a secondary set by circuit 28 implies that the secondary set corresponding to that selected correlation level has a series of image elements similar to a series of image elements from the primary set. This, in turn, implies that the portion of the image sensed by the primary set has moved the distance $d_1$, between arrays 12 and 14 during the time interval, indicated by circuit 32, between the sensing of the primary set and the sensing of the selected secondary set. Thus based on the known distance $d_1$ and the time interval indicated by circuit 32, the calculation circuit 36 has all the information required to calculate the forward velocity component of that portion of the image, that is, the component of the velocity of the image which is parallel to arrow A.

Apparatus 10 is capable not only of calculating the forward image velocity, but also of calculating the lateral image velocity of the image, that is, the velocity of the image in a direction perpendicular to arrow A. As is explained below in greater detail, correlation circuit 24 includes means for comparing with the primary set each of the successive sets in a plurality of different positions along the length of second array 14, some of which are indicated by the dashed lines 41–49, and for producing a comparison level indicating the level of comparison of said primary set with each of the successive sets in each of those different positions. Correlation circuit 24 also includes means for indicating the comparison level which indicates the best level of comparison produced for each given set and for indicating that comparison level on output line 26 as the correlation level for that successive set.

Apparatus 10 further includes a displacement determining circuit 50. The displacement determining circuit receives an output on line 51 from correlation circuit 24 telling it when a comparison level is chosen as indicating the best level of comparison for a given successive set, and it receives an output on line 30 from optimum correlation selection circuit 28 telling it when a correlation level indicates an optimal level of correlation for a plurality of successive sets. In response to these two inputs, displacement determining circuit 50 determines the displacement, or distance, between position 41 in which the successive set corresponding to the selected correlation level is sensed by the second array and the position corresponding to the comparison level indicated by the correlation circuit 24 which, when output as a correlation level, is selected by optimum correlation selection circuit 28 as the selected correlation level. Displacement determining circuit 50 provides this predetermined displacement over an output line 52 to image velocity calculation circuit 36. The calculation circuit 36 includes means for calculating the lateral image velocity of the image from the time interval supplied to it by time interval determining circuit 32, as discussed above, and the displacement supplied to it by the displacement determining circuit 50.

The numerals placed over the various sensors 18 of the first and second arrays 12 and 14 of FIG. 1 are used to illustrate the lateral motion of the image. Assume that the numerals placed over sensors 18 of the first array 12 correspond to the various portions of an image which are incident upon such sensors at the time when a primary set of image elements is sensed. Assume that the numerals placed over the various sensors 18 of the second array 14 correspond to the various portions of the same image which are incident upon such sensors of the second array at a later time when the portion of the image sensed by the primary set has had a chance to travel the distance $d_1$ between the two arrays. In the example illustrated in FIG. 1, it can be seen that the best correlation between the primary set and the successive set shown is produced at position 45, since at that position the image elements of the primary set and the corresponding image elements of the secondary set with which they are compared are derived from the same portion of the image. Thus the correlation circuit 24 chooses the comparison level corresponding to the position 45 and causes that chosen comparison level to be output over line 26 as the correlation level for the shown successive set.

Since it is assumed that the successive set shown in FIG. 1 is derived from the same portion of the image as the primary set shown in that figure, the correlation level produced for that shown successive set is selected by optimum correlation circuit 28 as indicating the optimum level of correlation between the primary set and any successive set. Thus selection circuit 28 causes displacement circuit 50 to detect the displacement $d_2$ between position 41 at which the successive set shown in FIG. 1 is sensed and position 45 corresponding to the indicated comparison level selected as the selected correlation level. Selection circuit 28 also causes time interval determining circuit 32 to determine the time interval between the sensing of the primary set and the successive set corresponding to the selected correlation level. From displacement $d_2$ and the time interval it takes for the image to travel distance $d_1$, the calculation circuit has all the information it needs to calculate the lateral velocity of the image.

Figure 2:
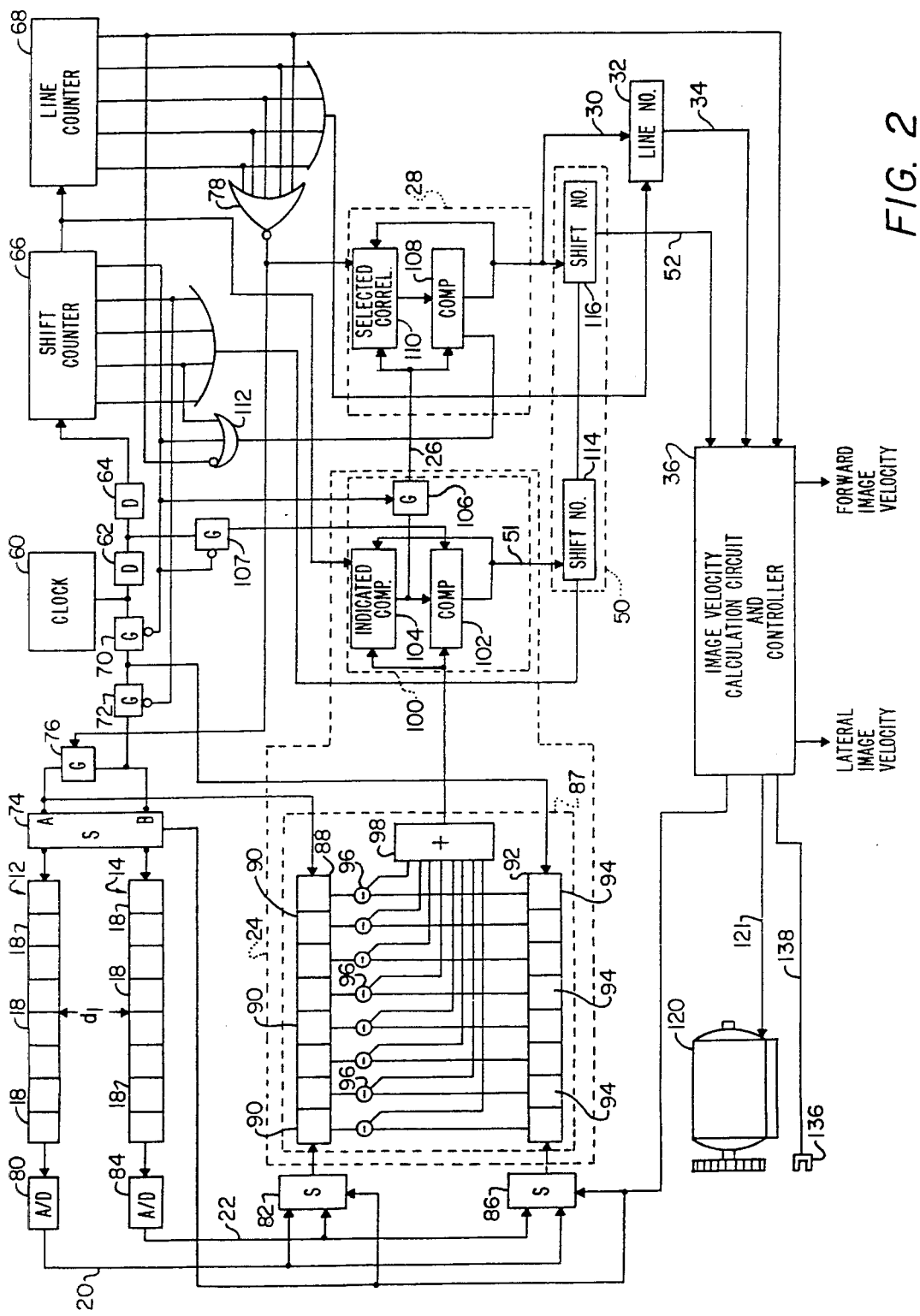
FIG. 2 is a more detailed block diagram of the apparatus shown in FIG. 1.

In FIG. 2 a more detailed block diagram of apparatus 10 is shown in which correlation circuit 24, selection circuit 28, and displacement determining circuit 50 are all shown in dashed lines. For purposes of simplification, arrays 12 and 14 of FIG. 2 are shown and discussed as each having only eight sensors 18, rather than sixteen, as in FIG. 1, or rather than the thousands of sensors which apparatus 10 would be likely to have in actual practice.

The timing of apparatus 10 is controlled by clock 60 which generates a continuous series of high-frequency periodic clock pulses, causing apparatus 10 to function in a series of repeated measurement cycles. The clock pulses produced by clock 60 are passed through first and second delay circuits 62 and 64, each of which delays the phase of those clock pulses by a duration equal to one third their period. The delayed clock pulses from delay circuit 64 are supplied to the input of a five bit shift counter 66, which repeatedly cycles from a shift count of zero to a shift count of thirty-one in response to every thirty-two clock pulses. The carry output of the shift counter 66 is supplied as the input to a five bit line counter 68, which cycles once from a line count of zero to a maximum line value during each measurement cycle of apparatus 10.

The output of clock 60 is also supplied to the input of a gate 70, the controlling input of which is an inverting input connected to the output of the fifth, or highest, order count bit of shift counter 66. As a result, only the first sixteen of the thirty-two clock pulses of each cycle of shift counter 66 are passed through gate 70. The output of gate 70 is supplied to the input of a gate 72. The controlling input of gate 72 is an inverting input connected to the output of the fourth, or second highest, order count bit of shift counter 66. As a result, only the first eight clock pulses of each cycle of shift counter 66 are passed through gate 72. The output of gate 72 is connected to the B input of a switching circuit 74 and through a gate 76 to the A input of switching circuit 74. Normally the A input of switching circuit 74 is connected to clocking input of first array 12 and the B input is connected to the clocking input of second array 14. The controlling input of gate 76 is connected to the output of a NOR gate 78, which receives as inputs the output of all the count bits of line counter 68. Thus the output of NOR gate 78 is high, and gate 76 passes clock pulses to input A of switching circuit 74, only when the count of line counter 68 is zero, which it is only during the first shift counter cycle of each measurement cycle.

Delay circuits 62 and 64 prevent counters 66 and 68 from changing their count values, and thus gates 70, 72 and 76 from changing their states, in response to a given clock pulse until that clock pulse has had time to attempt to pass through gates 70, 72 and 76.

As a result of the above-described circuitry, the first eight clock pulses, and only the first eight clock pulses, of each measurement cycle are supplied through gates 70, 72, and 76, and input A of switching circuit 74 to the first array 12. All subsequent clock pulses of the first shift counter cycle are blocked by either gates 70 or 72, and all clock pulses of subsequent shift counter cycles are blocked by gate 76. Array 12 functions as a CCD shift register, and the eight clock pulses supplied to it at the beginning of each measurement cycle cause the image elements sensed by its eight sensors 18 to be shifted out of array 12, through an analog-to-digital converter 80, which converts their analog values to corresponding digital values. These eight digital image elements are then supplied through output line 20 and switch 82 to correlation circuit 24 as the primary set of image elements.

Unlike the first array 12, which receives clocking pulses only during the first shift counter cycle of a measurement cycle because of the operation of gate 76, second array 14, which is not affected by gate 76, receives eight clocking pulses during each shift counter cycle of a measurement cycle. Thus, during each cycle of the shift counter the analog image elements sensed by the eight sensors 18 of array 14 are shifted out of that array. They are passed through analog-to-digital converter 84, which converts the analog values of the image elements into corresponding digital values, and then they are normally supplied through output line 22 and a switch 86 to correlation circuit 24 as a successive set of image elements.

Correlation circuit 24 includes comparing means 87, indicated by dotted lines, for comparing the primary set of image elements with each successive set of image elements in each of a plurality of different positions along the length of each such successive set and for producing a comparison level indicating the level of comparison of the primary set with each successive set in each of those different positions. Comparing means 87 includes a primary set shift register 88, having eight shift stages 90, and a successive set shift register 92, having eight shift stages 94. Primary set shift register 88 is normally connected through switch 82 to output line 20 of array 12 so as to receive the image elements of the primary set from that array at the beginning of each measurement cycle. Shift register 92 is connected to the output of gate 76, as normally is the clocking input of the first array, so that each image element of the primary set clocked out of array 12 is shifted into register 88. As is apparent to one skilled in the art of digital design, a delay circuit could be placed between the output of switching circuit 74 and the clocking input of array 12 to ensure that register 88 has time to read each value supplied at the output of array 12 before that value is changed by clocking.

Successive shift register 92 is normally connected through switch 86 to the output of gate 70 so as to receive the first sixteen clock pulses of each shift counter cycle. During the first eight clock pulses of each shift counter cycle, when pulses are applied to the clocking input of array 14, each image element clocked out of that array is shifted into shift register 92 so that on each successive clock pulse the series of image elements of the successive set occupy a successive position along the length of register 92. After the eighth clock pulse, all eight image elements of a successive set are in register 92. On the ninth through the sixteenth clock pulses of each shift counter cycle, no further image elements are clocked out of array 14, but the eight image elements which have already been shifted into register 92 continue to be shifted along the remaining successive positions of that register. As is apparent to one skilled in the art of digital design, a delay circuit could be placed between the output of switching circuit 74 and the clocking input of array 14 to ensure that the register 92 has time to read each value supplied at the output of array 14 before that value is changed by clocking.

Means 87 also includes eight subtracting circuits 96, a separate one of which is connected between each stage 90 of shift register 88 and a corresponding stage 94 of shift register 92. The output of each subtracting circuit 96 is equal to the difference between the image elements in its corresponding stages 90 and 94 of registers 88 and 92, respectively. Comparison means 87 further includes an adding circuit 98 to which all the outputs of subtracting circuits 96 are supplied. Adding circuit 98 produces an output comparison level having a value equal to the sum of the differences produced by all the subtracting circuits 96. A separate such comparison level is produced in response to each position of a given successive set along the length of register 92. The closer is the correlation between the values stored in registers 88 and 92 for a given position of the successive set, the smaller is the value of the comparison level produced by adding circuit 98.

The comparison levels output by adding circuit 98 are supplied to an indicating means 100, shown in dashed lines, for indicating the one of those comparison levels which indicates the best level of comparison produced for each successive set and for indicating that comparison level as the correlation level for that successive set. Indicating means 100 includes a comparator 102, an indicated comparison level latch 104, and a gate 106. The comparison levels produced by the adding circuit 98 are connected to the subtrahend input of comparator 102 and to the input of latch 104. The value stored in latch 104 is supplied to the minuend input of comparator 102. Comparator 102 receives an enable signal from the output of delay circuit 62 through gate 107. Gate 107 has an inverted controlling input connected to the output of the highest order bit of shift counter 66. Thus a delayed clock pulse is supplied to comparator 102 after the subtracting circuits 96 and adding circuit 98 have had time to produce a comparison level in response to each of the sixteen different positions of a successive set along register 92.

When it performs a comparison, comparator 102 produces an output indicating if the comparison level supplied to its subtrahend input is less than the previously indicated comparison level supplied to its minuend input. This output is connected to the latch enable input of latch 104. Thus whenever adding circuit 98 produces a comparison level which is lower than the comparison level stored in latch 104, indicating that the new comparison level represents a closer comparison than the value stored in latch 104, the new, lower comparison level is stored in latch 104 and becomes the new indicated comparison level. Latch 104 has a preset input which is connected to the carry output of shift counter 66. This connection causes the value in latch 104 to be set just before the start of each shift counter cycle to a value higher than any possible comparison level to ensure that the first comparison level produced during a shift counter cycle will be stored in latch 104.

The output of latch 104 is supplied through gate 106 to output line 26. The controlling input of gate 106 is connected to the output of the highest count bit of shift counter 66, which is high only at the end of each shift counter cycle, after comparison means 87 has compared the primary set in register 88 with a given successive set in each possible shifted position along the length of register 92. Thus at the end of each shift counter cycle, gate 106 produces on line 26 the indicated comparison level indicating the best level of comparison produced in response to all the comparisons performed by comparison means 87 during that shift counter cycle. This output is the correlation level which indicates the level of correlation between the primary set and the successive set with which the primary set is compared in the shift counter cycle.

Line 26 is connected to the input of optimum correlation selection circuit 28, which includes comparator 108 and a selected correlation level latch 110. The correlation level on line 26 is supplied as the subtrahend input of comparator 108 and is supplied to the input of latch 110. The value stored in latch 110 is supplied to the minuend input of comparator 108. Comparator 108 receives an enable signal from the output of an AND gate 112. AND gate 112 receives as uninverted inputs the outputs of the fifth and the second count bits of shift counter 66 and receives as an inverted input the output of the highest order count bit of line counter 68. The enable signal produced by AND gate 112 causes comparator 108 to perform a comparison only after the comparison level supplied to it over line 26 has had time to become stable.

When it performs a comparison, comparator 108 produces an output indicating if the new correlation level supplied to its subtrahend input is less than the previously selected correlation level supplied to its minuend input. This output is connected to the latch enable input of latch 108. Thus whenever correlation circuit 24 produces a correlation level at the end of a shift counter cycle which is lower than the selected correlation level previously stored in latch 108, the new, lower correlation level is stored in latch 108 and becomes the new selected correlation level. Latch 108 has a preset input which is connected to the output of NOR gate 78. This connection causes the value in latch 108 to be preset, and held to, a value higher than any possible correlation level during the first shift counter cycle of each measurement cycle. This prevents selection circuit 28 from responding to the output of correlation circuit 24 during the first shift counter cycle when the primary set is shifted into register 88 and it ensures that the correlation level produced during the second shift counter cycle will be stored in that latch.

Time interval determining circuit 32 is a latch which is connected to the outputs of all but the high order count bits of line counter 68. The latch enable input of latch 32 is connected through line 30 to the output of comparator 108. Each time comparator 108 determines that the correlation level supplied to it by correlation circuit 24 is lower than the value stored in latch 110, the output of comparator 108 causes latch 32 to store the current count of line counter 68. By the end of each measurement cycle the value stored in latch 32 is the count of line counter 68 at the time that the lowest, or optimal, correlation level is produced. This line count indicates the time interval between the sensing by array 12 of the primary set of image elements and the sensing by array 14 of the successive set of image elements which corresponds to the optimal correlation level.

Displacement determining circuit 50 includes two latches 114 and 116. Latch 114 receives as inputs the outputs of the first four count bits of shift counter 66, and it receives a latch enable input from the output of comparator 102 of correlation circuit 24. Thus each time comparator 102 determines that a comparison level supplied to it by adder 98 is lower, and thus better, than the previously indicated comparison level in latch 104, the current count of shift counter 66 is stored in latch 114. This stored value indicates the shift position of the successive set for which the better comparison level is produced. At the end of each shift counter cycle the count stored in latch 114 indicates the shift position corresponding to the best comparison level produced for that shift counter cycle.

The output of latch 114 is supplied to the input of latch 116. Latch 116 receives a latch enable input from the output of comparator 108 of selection circuit 28. Thus each time comparator 108 determines that a correlation level supplied to it by correlation circuit 24 is lower, and thus more optimal, than the previously selected correlation level in latch 110, the value currently stored in latch 114 is stored in latch 116. The shift count stored in latch 116 indicates the shift position at which the comparison level selected as the more optimal correlation level is produced. At the end of each measurement cycle the shift count stored in latch 116 indicates the shift position corresponding to the optimum correlation level selected by the selection circuit 28 during the entire measurement cycle. This shift position indicates the displacement between the position in which the successive set corresponding to the optimum correlation level is sensed by array 14 and the position at which the correlation level selected as the optimum correlation level is produced. In FIG. 2, the successive sets are sensed by array 14 in a position that is directly below the position in which the primary set is sensed by array 12, and this is the same position that the primary and the secondary sets have relative to each other after the eighth clock pulse of each shift counter cycle. The shift count stored in register 116 indicates the displacement between this relative position and that which exists between the primary and successive sets at the time that best comparison is produced between those sets during a measurement cycle.

Output 34 of time interval determining circuit 32, output 52 of displacement determining circuit 50, and the output of the highest order bit of line counter 68 are all connected to inputs of image velocity calculation circuit 36. During the last half of each measurement cycle the highest order bit of counter 68 goes high. This high output, through its input to AND gate 112, prevents further enablement of comparator 108, which in turn prevents the values in latches 32 and 116 from changing, and it causes circuit 36 to begin calculating the forward and lateral image velocities. Circuit 36, which is a programmable controller which also performs other control functions for apparatus 10, calculates the forward image velocity as a function of the known distance $d_1$ between arrays 12 and 14 and of the time which the line count stored in latch 32 indicates that it took the portion of the image sensed by array 12 to travel to, and be sensed by, array 14. Circuit 36 calculates the lateral image velocity as a function of the time indicated by the line count stored in latch 32 and of the displacement indicated by the shift count stored in latch 116, which indicates the number of sensors 18 that the portion of the image sensed by array 12 has traversed laterally before it was sensed by array 14.

Apparatus 10 normally measures velocity of an image in a direction pointing from the first array 12 to the second array 14. However, the apparatus is provided with switching circuits 74, 82 and 86 so that it can measure image velocity in the opposite direction. Controller 36 has an output connected to all of these switches that can switch them from their normal state to a reverse state. In the reverse state switching circuit 74 reverses the connection of its A and B inputs to the clocking inputs of arrays 12 and 14. This causes the second array 14 to receive eight clocking pulses at the beginning of each measurement cycle so that the primary set of image elements is derived from that array, and it causes the first array 12 to receive eight clock pulses at the beginning of each shift counter cycle so that the successive sets are derived from array 14. In the reverse state, switches 82 and 86 supply the output of first array 12 to the successive set register 92 and the output of the second array 84 to the primary set register 88. In all other regards the normal and the reverse operation of apparatus 10 are the same.

Figure 3:
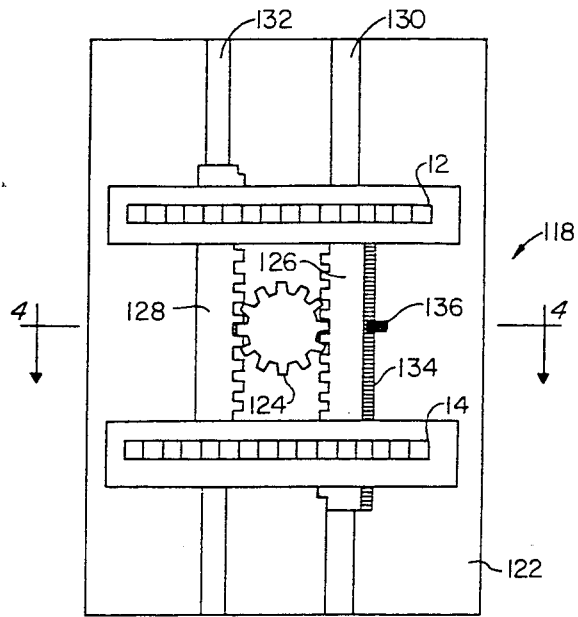
FIG. 3 is a diagrammatic top view of apparatus for changing the distance between linear arrays of sensors according to one embodiment of the invention.
Figure 4:
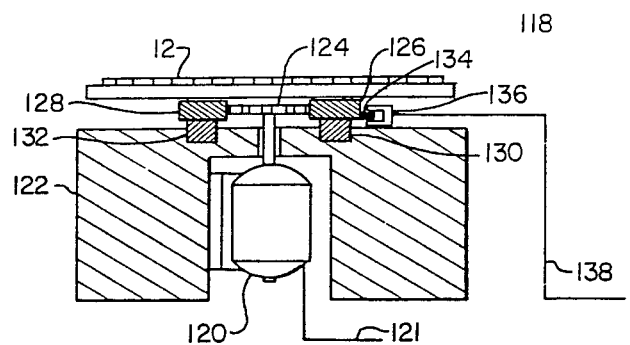
FIG. 4 is a cross section of the apparatus shown in FIG. 3 taken along line 4—4 in FIG. 3.

FIGS. 3 and 4 show a device 118 for changing the distance between arrays 12 and 14 by a known amount. Device 118 is used by controller 36 to keep the time it takes a portion of an image to travel between arrays 12 and 14 within the time which can be measured in a given measurement cycle. Device 118 includes motor 120 which is connected via line 121 to controller 36, as shown in FIG. 2. Motor 120 is mounted below the center of platform 112 in such a portion that an extension of its rotor extends perpendicularly through a hole in the top of that platform. Attached to the end of the rotor extension of motor 120 is pinion 124. This pinion drives two parallel racks 126 and 128 which are engaged with diametrically opposite edges of pinion 124 and which are mounted to slide in parallel tracks 130 and 132, respectively, in the top of platform 122. First array 12 is mounted on and extends perpendicular to rack 126, and second array 14 is mounted on and extends perpendicular to rack 128. Thus if motor 120 rotates pinion 124 in a clockwise direction as seen in FIG. 3, arrays 12 and 14 will be moved closer together, enabling apparatus 10 to measure slower image velocities, and if motor 120 rotates pinion 124 in the opposite direction the arrays will be moved further apart, enabling apparatus 10 to measure more rapid image velocities.

A strip 134 is attached to the edge of rack 126. Strip 134 contains a succession of closely and evenly spaced transparent stripes. Photodetector 136 is mounted on the top of platform 122 in a position so that strip 134 passes between its light-emitting and its light-sensing elements. The output of photodetector 136 is passed through an output line 138 to controller 36, as shown in FIG. 2. Whenever the controller causes the device 118 to alter the distance between arrays 12 and 14, it monitors the output of photodetector 136 so that it continues to know the distance between the arrays, as is necessary for it to make accurate calculations for forward and lateral image velocity.

It can be seen that apparatus 10 provides means for determining length of time between the sensing of a series of image elements having a given set of values by array 12 and the sensing by array 14 of a series of image elements having a similar set of values. Thus it can be used not only to sense the velocity of an entire image, as in airborne reconnaissance cameras where the motion of the ground being focussed relative to the airplane in which the camera is located causes the whole image to move, but also to sense the velocity of a portion of an image, such as the portion of an image which corresponds to a moving object such as an aircraft observed against the sky.

In alternate embodiments of the invention, it is not necessary that every successive set of image elements sensed by array 14 be correlated with the primary set sensed by array 12. For example, if the controller which is operating the device already knows with some accuracy from previous measurements the velocity of the image, it need only correlate the primary set with those successive sets which correspond with the image's expected velocity range.

In alternate embodiments of the invention the output of the correlation circuit 24 could be supplied directly to a programmable processor which would select the best comparison level of each successive set and which would select the successive set having the optimum correlation level. Such a processor could be programmed to choose the best comparison level not only on the basis of the value of a given comparison level, but also on the basis of comparison levels from neighboring shift positions of the same successive set. This would minimize the chance that noise in the operation of the apparatus would cause the choice of an erroneous comparison level. Similarly, the processor could be programmed to take into account the value of preceding and succeeding correlation levels in selecting the optimum correlation level.

In alternate embodiments of the invention, the first and second arrays could be other than linear arrays. For example each such array could be composed of several rows of image elements.

Other embodiments of the invention will occur to those skilled in the art and are within the following claims:

What is claimed is:

1. Apparatus for measuring the velocity of a moving image or object comprising:
   a first array of sensors extending in a first direction transverse to image motion for sensing a primary set of image elements;
   a second array of sensors extending generally in said first direction and spaced a known distance from said first array for sensing successive sets of image elements;
   means for correlating said primary set of image elements with each of said successive sets of image elements and producing a correlation level indicating the level of correlation of said primary set with each of said successive sets, said means for correlating including means for comparing with said primary set each said successive set in a plurality of different positions along said first direction and for producing a comparison level indicating the level of comparison of said primary set with said successive set in each of said different positions;
   means for selecting one of said correlation levels which indicates an optimum level of correlation; and means for determining the time interval between the sensing by said first array of said primary set and the sensing by said second array of said successive set corresponding to said selected correlation level.

2. The apparatus of claim 1 further including means for calculating a forward image velocity component from said time interval and said known distance between said arrays.

3. The apparatus of claim 1 in which said means for correlating further includes means for indicating the one of said comparison levels which represents the best level of comparison produced for said successive set.

4. The apparatus of claim 3 further including means for determining the displacement between the position in which the successive set is sensed and the position corresponding to the indicated comparison level.

5. The apparatus of claim 4 further including means for calculating the lateral image velocity component from said time interval and said displacement.

6. The apparatus of claim 1 in which said first and second arrays are linear.

7. The apparatus of claim 1 in which at least one of said first and second arrays is a charge-coupled device.

8. The apparatus of claim 1 further including means for changing the distance between the first and second arrays.

9. The apparatus of claim 1 further including switching means for interchanging the inputs from said first and second arrays to said means for correlating, for enabling said primary set of image elements to be sensed by said second array and said successive sets of image elements to be sensed by said first array.

10. Apparatus for measuring the velocity of a moving image or object comprising:
   a first array of sensors extending in a first direction transverse to image motion for sensing a primary set of image elements;
   a second array of sensors extending generally in said first direction and spaced a known distance from said first array for sensing successive sets of image elements;
   means for comparing with said primary set each said successive set in a plurality of different positions along said first direction and for producing a comparison level indicating the level of comparison of said primary set with said successive set in each of said different positions;
   means for indicating the one of said comparison levels which indicates the best level of comparison produced for each said successive set and for indicating that comparison level as a correlation level indicating the level of correlation of said primary set with that successive set;
   means for selecting one of said correlation levels which indicates an optimal level of correlation between said successive sets and said primary set; and
   means for determining the time interval between the sensing by said first array of said primary set and the sensing by said second array of said successive set corresponding to said selected correlation level.

11. The apparatus of claim 10 further including means for calculating a forward image velocity component from said time interval and said known distance between said arrays.

12. The apparatus of claim 11 further including:
   means for determining the displacement between the position in which the successive set corresponding to said selected correlation level is sensed and the position corresponding to the indicated comparison level selected as said selected correlation level; and
   means for calculating a lateral image velocity component from said time interval and said displacement.

13. Apparatus for measuring the velocity of a moving image or object comprising:
   a first array of sensors extending in a first direction transverse to image motion for sensing a primary set of image elements;
   a second array of sensors extending generally in said first direction and spaced a known distance from said first array for sensing successive sets of image elements;
   means for comparing with said primary set a successive set in a plurality of different positions along said first direction and for producing a comparison level indicating the level of comparison of said primary set with said successive set in each of said different positions;
   means for indicating the one of said comparison levels which indicates the best level of comparison produced for said successive set; and
   means for determining the displacement between the position in which said given successive set is sensed and the position corresponding to said indicated comparison level.

14. The apparatus of claim 13 further including means for determining the time interval between the sensing by said first array of said primary set and the sensing by said second array of said given successive set; and means for calculating a lateral image velocity component from said time interval and said displacement.

* * * * *